United States Patent
Richardson

[11] 3,907,332
[45] Sept. 23, 1975

[54] SUSPENSION SYSTEM

[76] Inventor: Donald G. Richardson, 4113 Lanterman Ln., La Canada, Calif. 91011

[22] Filed: Nov. 25, 1974

[21] Appl. No.: 526,971

[52] U.S. Cl. ............................ 280/285; 267/15
[51] Int. Cl.² ........................................ B62K 25/20
[58] Field of Search .......... 280/285, 284, 277, 286, 280/124 A; 267/15

[56] References Cited
FOREIGN PATENTS OR APPLICATIONS
16,077  6/1911  United Kingdom ............... 280/285
10,179  12/1910  United Kingdom ............... 280/285

*Primary Examiner*—Philip Goodman
*Attorney, Agent, or Firm*—John E. Wagner

[57] ABSTRACT

Disclosed is a suspension system for two wheeled vehicles, bicycles and motorcycles, in which the rear wheel is sprung by a single spring member connected to a swing arm via a linkage. The spring is located within the frame and does not add to the width of the vehicle, and the linkage is so connected that the force of the spring increases with increasing deflection of the rear wheel. The spring and linkage cooperate with the frame which provides the reference point for the linkage and spring system.

10 Claims, 5 Drawing Figures

SUSPENSION SYSTEM

BACKGROUND OF THE INVENTION

Typically, bicycles have had rigid rear suspension systems leaving spring mounting to the front wheel only. In motorcycles, particularly those intended for travel over rough terrain in moto-cross races and the like, the spring mounting of both the front and rear wheel are essential. In the most difficult riding terrains, the rider shifts his weight rearward, lifting the front wheel off of the ground and, under these conditions, it is absolutely essential that the rear wheel maintain good traction with the ground. If the suspension is unsprung or poorly sprung, the rear wheel can tend to bounce, and lose what traction the vehicle has and the stability of the entire vehicle can be lost. Rear spring systems are helpful and shock absorbers are commonly used. Typically, direct acting springs are connected between the frame and rear wheel swing arm. One spring assembly is located on each side of the wheel adding to the weight and width of the vehicle. Attempts have been made in the past to provide a single spring and shock absorber assembly mounted horizontally within the frame of the motorcycle, again providing direct action on the spring. These systems, sometimes termed "mono-shock suspensions" eliminate the double spring, their additional size and the problem of balancing. In a number of four wheeled vehicle systems, it has been known to use intermediate linkages between the spring, the wheel and the frame. Examples of such disclosures are found in the following patents:

| | |
|---|---|
| 2,160,608 | Watson |
| 2,342,381 | Thornhill |
| 2,549,320 | Makin |
| 2,632,655 | King |
| 2,815,961 | Brueder |
| 3,591,198 | Brando |
| 3,752,499 | Brandstadter |

Most of the foregoing disclosures, for example, the U.S. Pat. No. 2,815,961, show direct acting springs while the patent 3,591,198 shows the variable spring rate. The purpose of the variable spring rate is to provide increased loading and greater deflection and prevent bottoming out.

U.S. Pat. No. 3,752,499 shows a hydraulic spring system in which it is recognized that in travel over rough terrain a variable rate suspension system is desirable, including one with a positive rate of change of vertical force with respect to wheel displacement.

In certain race cars, it has been likewise determined that an increase or rising rate spring system is advantageous. Examples are disclosed in Road & Track Magazine, December, 1974, pages 109 through 112. In such cases, the suspension system is relatively complicated because of the need to displace the wheel laterally to mount or otherwise provide for brakes and to maintain caster and camber of the wheel as well. The understanding and application of outboard or four wheel suspension systems has not, in the past, been applicable to two wheel vehicles.

BRIEF DESCRIPTION OF THE DRAWING

This invention may be more clearly understood from the following detailed description and by reference to the drawings in which.

DETAILED DESCRIPTION OF THE INVENTION

Figure 1:
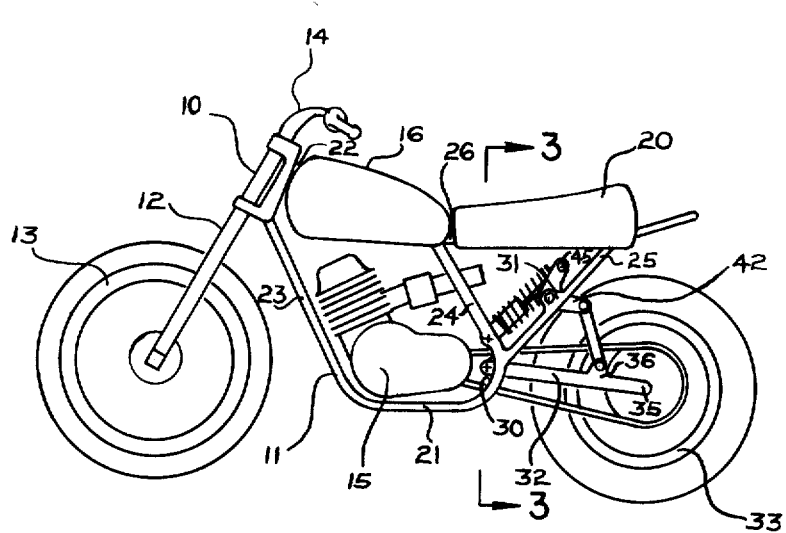
FIG. 1 is a side elevational view of a motorcycle incorporating this invention.

Now referring to FIG. 1, a motorcycle 10 may be seen therein as including a frame 11 with a front fork and wheel assembly 12 supporting the front wheel 13 and handlebars 14. The frame 11 mounts a motor-transmission assembly 15, a gasoline tank 16 and a seat 20. The frame 11, as in most two wheeled vehicles, defines a closed configuration for added strength. In this case, the main frame section is generally a parallelagram with a lower frame member 21 matched by an upper frame member 22, partially encircled by a gasoline tank 16. A second pair of frame members 23 and 24 close the basic frame structure and provide a region for cradleing the motor and transmission assembly 15.

An auxilliary frame portion, which is generally triangular in shape, is made up of the frame member 24 as well as a rearward extending frame member 25 which forms a closed triangle with a horizontal frame member 26 supporting the seat 20. This form of frame is common and in certain cases, is double with a pair of such assemblies laterally spaced and interconnected by braces, unshown, in order to provide a rigid structural body for the motorcycle. Of course, it is recognized that the particular shape and configuration of the frame is not essential to this invention, only that it is a rigid structure which defines at least two points for pivotal engagement of the rear suspension system. These points are denoted by the gusset plates 30 and 31. The plate 30 is located generally at a corner of the frame which may be termed an apex of the triangular frame portion made up of members 24 and 26 or a corner of the parallelagram portion defined by the members 21 through 24.

Pivotally secured to the plate 30 is the rear swing arm 32 which mounts the rear wheel 33. The plate 30 and its associated axle 34 are positioned such that, in the normal loaded condition, including the weight of the motorcycle and rider, the swing arm 32 is located at an angle $\theta$ with respect to the horizontal. The angle $\theta$ is preferably between 0° and 5° below the horizontal. The swing arm 32 has the rear axle 35 for the rear wheel 33 located generally at its outermost or rear point of its length and at an intermediate bracket 36 an arm 41 is grounded at point 40. The arm 41 constitutes the interconnection between the swing arm 32 and the remainder of the suspension.

The remaining basic elements of the suspension include a link or bell crank 42 pivotally secured to the frame member 25 at an intermediate point by axle 43. One extremity of the link 42 is pivotally connected to the arm 41 at point 44. The opposite extremity of the link or bell crank 42 is pivotally connected at point 45 to an end of compression spring member 46 constituting the basic springing element of the suspension. The spring surrounds a shock absorber 50 and is secured at the lower end of the spring 46 to a ring 51 forming a part of the body of the shock absorber 50. The lower end of the shock absorber 50 is pivotally secured to the frame member 24 at point 52 while upper end of spring 46 and shock absorber 50 are secured to the link 42 at point 45. The spring and shock absorber work together as a common unit and are known as a coil-over-shock assembly. The shock absorber provides its normal function of damping oscillations and may be adjustable to provide selection of the damping characteristics of the suspension system. It should be noted that the spring and shock absorber assembly are positioned within the frame, in space otherwise unused. This is of significance in that it removes unwanted complexity in the region of the rear wheel. This arrangement further locates the major weight portion of the suspension system, namely the spring and shock absorber assembly, closer to the longitudinal center of the vehicle and lower than any known single spring assembly. The lowering of the center of gravity is definitely a desirable feature for stability in performance vehicles of this type. It should also be noted that the spring and shock absorber assembly is oriented in a partially vertical arrangement and closer to the vertices with greater deflection and rougher riding. Where the shock absorber will be more highly used, the spring turns are positioned for free flow of cooling air past the shock absorber and the spring turns. This is noted because of previous single spring assemblies located in a generally horizontal position suffer from overheating the change of characteristics.

The most significant aspect of the suspension system of FIG. 1 however, involves the relationship of the swing arm 32, the compression arm 41, the link 43 and the spring and shock absorber assembly 46,50. With the swing arm 32 pivoted at 34 and the link 42 pivoted at 43, rotation of the link 41 due to upward movement of swing arm 32, as transmitted through arm 41 produces rotational movement of the point 45 and compressive displacement of the free end of spring 46 as a function of the sine of angle of rotation $\theta$ of the link 42 from 0° at the position of minimum deflection as shown in the drawing, FIG. 2.

The spring load imposed on link 42 and transmitted to the swing arm 32 is composed of the spring force times the effective arm of the link 42. The effective arm is equal to the length of the arm A times the sine of angle $\theta$ as measured from a minimum of 0 load condition representing 0° $\theta$.

The effect to the rider is, (a) a soft springing system for minor deflections; (b) reduced liklihood of bottoming out; (c) east of following small depressions in the surface as well as small rises; (d) provides high resistance force to major deflections of the suspension system.

Figure 2:
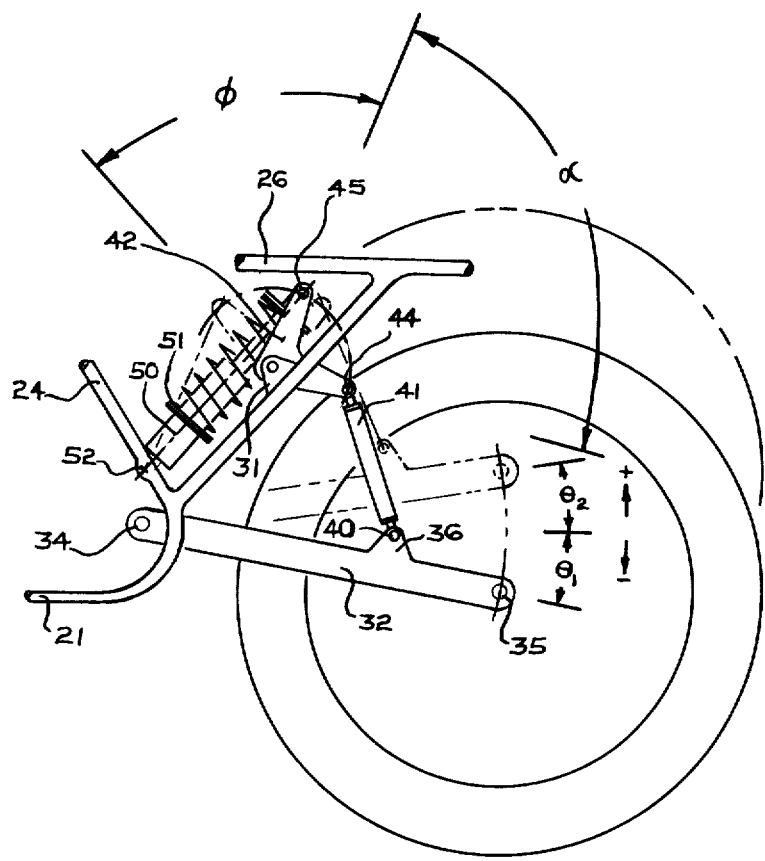
FIG. 2 is a fragmentary simplified view of the suspension system of the motorcycle of FIG. 1.

Each of the details of this suspension system and particularly the relationships described above, are more clearly apparent in FIGS. 2 and 3. In particular, the angle $\theta$ about the horizontal is visible with negative angles measured below the horizontal and positive above the horizontal. The angle of deflection of the link 43 identified as angle $\phi$, is also apparent in FIG. 2. In that figure, two extreme positions are shown. In FIG. 2 a major deflection comparable to extreme terrain results in the deflection over the angle $\theta_1+\theta_2$. This is produced by a movement of angle $\phi$ of the link 43. The compression of spring 46 upon such movement is a function of the sine of angle $\phi$. The size of angle $\phi$, or any particular angle $\theta$ is a function of the location of the plates 30 and 31. I have found that employing a swing arm of 17 inches in length, the following dimensions are appropriate for use with the spring and shock assembly identified below.

Length of arm 41; 7¾ inches Arm 32, 17½ inches;
Distance A on link 43;4 inches Spring 46,50, 11⅜–8⅜ inches.
Distance B on link 43;4 inches
Length of spring 46; 9 inches unrestrained
Shock absorber 50. 11⅜ inches eye bolt to eye bolt.

Figure 4:
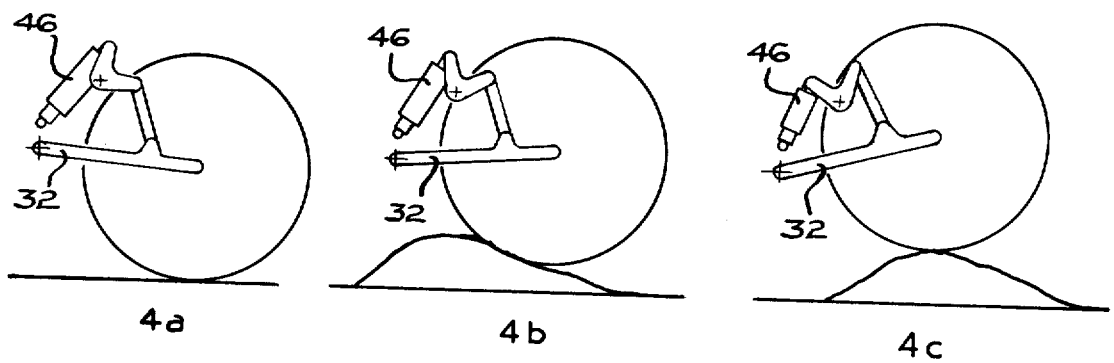
FIG. 4 is a simplified pictorial representation of the suspension system of this invention in three different states of deflection, as shown in FIG. 4a of minimum deflection, FIG. 4b and FIG. 4c, major deflection.

The effect of the suspension system of FIGS. 1 and 2 is also clearly apparent in FIGS. 4a, 4b and 4c. While riding on smooth terrain, I have shown in FIG. 4 the swing arm 32 is generally horizontal. Minor deviations in the terrain produce minor axial displacement in the length of spring 46. As the angle $\phi$ increases in FIG. 4b, the compression of spring 40 increases. Near maximum deflection is shown in FIG. 4c.

The coil over shock absorber assembly employed is a Koni type 80×2000 of the Neatherlands with coil spring having a spring rate of 200 pounds per inch with 2 inches of preload (400 pounds). Other types of springs and shock absorbers may be used.

Figure 3:
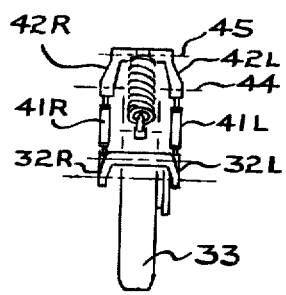
FIG. 3 is a vertical sectional view of the motorcycle of FIG. 1 taken along lines 3—3 of FIG. 1.

FIG. 3 illustrates particularly that the single spring is located in alignment with the wheel 33 and each of the suspension parts 32, 41 and 42 have their left and right components.

Figure 5:
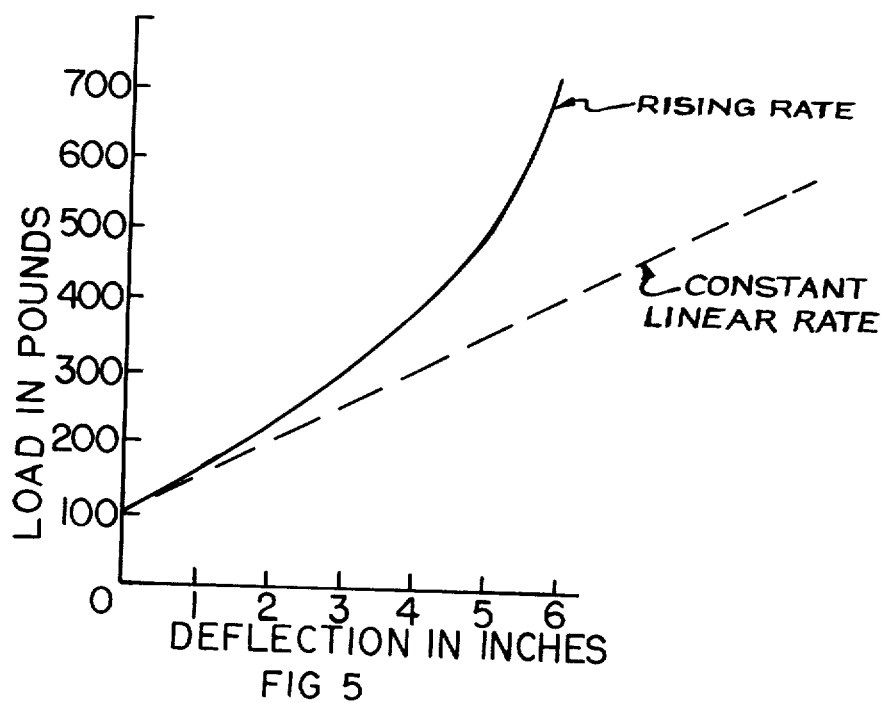
FIG. 5 is a graphical representation of the force load in pounds as a function of deflection of the wheel of the apparatus of FIG. 1.

The net result of the system arrangement as shown in FIGS. 1 and 2, from a graphical standpoint, is illustrated in FIG. 5. With the swing arm 32 at a 0° or $-\theta$ deflection angle, the weight of the vehicle and rider produces a preload on the spring in the order of 230 pounds. Over deflections of less than 5°, e.g. smooth riding surface, the preload remains substantially constant for a smooth ride. As deflection increases up to a maximum of 6 inches, the resistance to deflection increases along a rising curve which constitutes the rising rate. This is in contrast with a straight compression spring assembly showing the flat rate of the dashed line of FIG. 5. The rising rate is accomplished using a uniform rate spring similar to that producing the straight line characteristic. The rising rate is obtained because of the linkage. This rising rate characteristic may be varied by changing the position of points 44 and 45 in FIG. 2. It may easily be accomplished by multiple holes in the link 42 and by moving the connection point to the arms 41 and spring 46 respectively.

The above described embodiments of this invention are merely descriptive of its principle and are not to be considered limiting. The scope of this invention instead shall be determined from the scope of the following claims, including their equivalents.

What is claimed is:

1. A suspension for two wheeled vehicles comprising:
   a frame for the vehicle comprising a generally closed shape including upper and lower portions and
   a swing arm pivotally connected to the lower portion of said frame;
   said swing arm comprising a pair of arms rotatably supporting a wheel about a horizontal axis generally at the end of said swing arm;
   the pivotal mounting of said arm to said frame being about a generally horizontal axis whereby said wheel is both rotatable about its own horizontal axis and deflectable in a generally vertical direction about the axis of said swing arm;

spring means having a first end pivotally secured to said frame;

a link member including an intermediate point pivotally mounted on said frame about an axis, parallel to the axis of said swing arm at a point spaced therefrom;

pivotal connection means between said link member and the second end of said spring;

a bar pivotally connected at one end to said swing arm and at the opposite end to said link member at a position spaced from said spring connection;

said spring, bar, swing arm and link connected whereby deflection of said swing arm displaces said bar and rotates said link member to compress said spring.

2. The combination in accordance with claim 1 wherein said spring is located within said closed structure of said frame.

3. The combination in accordance with claim 1 wherein rotation of said link member produced rotational movement as well as deflection of said spring with the deflection a function of the sine of the angle of rotation of said link member.

4. The combination in accordance with claim 1 wherein said bar is connected to said swing arm between the axis of said wheel and the axis of said swing arm connection to said frame.

5. The combination in accordance with claim 1 wherein said frame includes a generally horizontal upper member and a lower apex and said link member is secured intermediate said horizontal member and said apex of said frame.

6. The combination in accordance with claim 1 wherein said swing arm extends rearward of said frame and said wheel constitutes the rear wheel of the vehicle.

7. The combination in accordance with claim 1 wherein said spring member encloses shock absorber means coupled to the ends of said springs.

8. The combination in accordance with claim 1 wherein said spring member is generally aligned with the plane of said wheel.

9. The combination in accordance with claim 1 wherein said assembly provides a rising spring rate as a function of deflection of said swing arm.

10. The combination in accordance with claim 1 wherein said link is positioned wherey said spring and a line between the point of securement of said link to said frame and the point of securement of said link to said spring is substantially parallel to the longitudinal axis of the spring for zero or maximum negative deflection of said swing arm.

* * * * *